US012645401B2

(12) United States Patent
Ma

(10) Patent No.: US 12,645,401 B2
(45) Date of Patent: Jun. 2, 2026

(54) MEMORY SYSTEM AND OPERATION METHODS THEREOF

(71) Applicant: YANGTZE MEMORY TECHNOLOGIES CO., LTD., Wuhan (CN)

(72) Inventor: Yue Ma, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 72 days.

(21) Appl. No.: 18/731,795

(22) Filed: Jun. 3, 2024

(65) Prior Publication Data

US 2025/0370656 A1      Dec. 4, 2025

(30) Foreign Application Priority Data

May 30, 2024    (CN) .......................... 202410692524.5

(51) Int. Cl.
*G06F 3/06*                (2006.01)

(52) U.S. Cl.
CPC .......... *G06F 3/0659* (2013.01); *G06F 3/0604* (2013.01); *G06F 3/0644* (2013.01); *G06F 3/0679* (2013.01)

(58) Field of Classification Search
CPC .... G06F 3/0659; G06F 3/0604; G06F 3/0644; G06F 3/0679
See application file for complete search history.

(56) References Cited

U.S. PATENT DOCUMENTS

| | | | | |
|---|---|---|---|---|
| 9,342,402 | B1 * | 5/2016 | Ong | G06F 13/1668 |
| 11,941,272 | B2 * | 3/2024 | Kim | G06F 3/0616 |
| 12,307,116 | B2 * | 5/2025 | Esaka | G06F 3/0604 |
| 2021/0064290 | A1 * | 3/2021 | Kanno | G06F 3/0604 |

* cited by examiner

*Primary Examiner* — Sean D Rossiter
(74) *Attorney, Agent, or Firm* — BAYES PLLC

(57)                ABSTRACT

In certain aspects, a method of operating a memory system is disclosed. A write command is received, which indicates that a length of data transferred from a host is smaller than a length of a minimal writable data unit of the memory system. Responsive to the write command, the data is stored in the memory device.

20 Claims, 14 Drawing Sheets

<u>1100</u>

GENERATE A WRITE COMMAND WHICH INDICATES THAT A LENGTH OF DATA TO BE TRANSFERRED TO A MEMORY SYSTEM IS SMALLER THAN A LENGTH OF A MINIMAL WRITABLE DATA UNIT OF THE MEMORY SYSTEM — 1104

SEND THE WRITE COMMAND TO THE MEMORY SYSTEM — 1106

| Bit<br>Byte | 7 | 6 | 5 | 4 | 3 | 2 | 1 | 0 |
|---|---|---|---|---|---|---|---|---|
| 0 | OPERATION CODE (8Ah) | | | | | | | |
| 1 | WRPROTECT | | | DPO | FUA | Reserved | Obsolete | DLD2 |
| 2 | (MSB) | | LOGICAL BLOCK ADDRESS (LBA) | | | | | |
| ... | | | | | | | | |
| 9 | | | | | | | | (LSB) |
| 10 | (MSB) | | TRANSFER LENGTH | | | | | |
| ... | | | | | | | | |
| 13 | | | | | | | | (LSB) |
| 14 | DLD1 | DLD0 | GROUP NUMBER | | | | | |
| 15 | CONTROL | | | | | | | |

FIG. 7

| Bit / Byte | 7 | 6 | 5 | 4 | 3 | 2 | 1 | 0 |
|---|---|---|---|---|---|---|---|---|
| 0 | OPERATION CODE (FEh) | | | | | | | |
| 1 | WRPROTECT | | | DPO | FUA | Reserved | Obsolete | DLD2 |
| 2 | (MSB) | | | | | | | |
| ... | LOGICAL BLOCK ADDRESS (LBA) | | | | | | | |
| 9 | | | | | | | | (LSB) |
| 10 | (MSB) | | | | | | | |
| ... | TRANSFER LENGTH | | | | | | | |
| 13 | | | | | | | | (LSB) |
| 14 | DLD1 | DLD0 | | GROUP NUMBER | | | | |
| 15 | ENABLE | | | DUMMY CONTROL | | | | |
| 16 | EFFECTIVE LENGTH | | | | | | | |
| 17 | CONTROL | | | | | | | |

FIG. 9A

| Bit / Byte | 7 | 6 | 5 | 4 | 3 | 2 | 1 | 0 |
|---|---|---|---|---|---|---|---|---|
| 0 | OPERATION CODE (FEh) | | | | | | | |
| 1 | WRPROTECT | | | DPO | FUA | Reserved | Obsolete | DLD2 |
| 2 | (MSB) | | | | | | | |
| ... | LOGICAL BLOCK ADDRESS (LBA) = 0X00 | | | | | | | |
| 9 | | | | | | | | (LSB) |
| 10 | (MSB) | | | | | | | |
| ... | TRANSFER LENGTH = 32 (128K) | | | | | | | |
| 13 | | | | | | | | (LSB) |
| 14 | DLD1 | DLD0 | GROUP NUMBER | | | | | |
| 15 | ENABLE = 1 | DUMMY CONTROL = 0 | | | | | | |
| 16 | EFFECTIVE LENGTH = 1 (4K) | | | | | | | |
| 17 | CONTROL | | | | | | | |

RECEIVE A WRITE COMMAND WHICH
INDICATES THAT A LENGTH OF DATA TRANSFERRED FROM A HOST
IS SMALLER THAN A LENGTH OF A MINIMAL WRITABLE DATA UNIT OF
THE MEMORY SYSTEM                                                    1002

RESPONSIVE TO THE WRITE COMMAND, STORE THE DATA IN THE
MEMORY DEVICE                                                        1004

<u>1100</u>

GENERATE A WRITE COMMAND WHICH INDICATES THAT A LENGTH OF DATA TO BE TRANSFERRED TO A MEMORY SYSTEM IS SMALLER THAN A LENGTH OF A MINIMAL WRITABLE DATA UNIT OF THE MEMORY SYSTEM — 1104

SEND THE WRITE COMMAND TO THE MEMORY SYSTEM — 1106

MEMORY SYSTEM AND OPERATION METHODS THEREOF

CROSS-REFERENCE TO RELATED APPLICATIONS

This application claims the benefit of priority to Chinese Application No. 202410692524.5, filed on May 30, 2024, which is incorporated herein by reference in its entirety.

BACKGROUND

The present disclosure relates to memory systems and operation methods thereof.

Non-volatile storage devices such as solid-state drives (SSDs), non-volatile memory express (NVMe), embedded multimedia cards (eMMCs), and universal flash storage (UFS) devices, etc., have gained significant popularity in recent years due to their numerous advantages over traditional hard disk drives (HDDs), such as faster read and write speed, durability and reliability, reduced power consumption, silent operation, and smaller form factors. For example, non-volatile storage devices such as SSDs may use NAND Flash memory for non-volatile storage.

SUMMARY

In one aspect, a method of operating a memory system is disclosed. A write command is received, which indicates that a length of data transferred from a host is smaller than a length of a minimal writable data unit of the memory system. Responsive to the write command, the data is stored in the memory device.

In some implementations, the write command includes an effective length field indicative of the length of the data.

In some implementations, the write command further includes a dummy control field indicative of a location of the data within the minimal writable data unit.

In some implementations, the write command further includes an enable field indicative of whether to enable padding the data with dummy data on the memory system.

In some implementations, responsive to the enable field having an enabled value, the padding of the data is enabled on the memory system.

In some implementations, the write command further includes a transfer length field indicative of the length of the minimal writable data unit.

In some implementations, the write command further includes a logical block address (LBA) field indicative of a logical location where the data is to be stored in the memory device.

In some implementations, the write command is received by a frontend interface of the memory system, and the method further includes receiving, by the frontend interface, the data which has the length indicated by the effective length field from the host.

In some implementations, responsive to the write command, storing the data in the memory device includes determining an LBA based on the LBA field; responsive to the enable field having the enabled value, padding the data with the dummy data to generate padded data based on the transfer length field and the dummy control field, where a length of the padded data is equal to the length of the minimal writable data unit; and storing the padded data in the memory device based on the LBA.

In some implementations, a logical space of the memory device is divided into a plurality of zones. Each zone includes a plurality of logical blocks corresponding to a plurality of LBAs, and the plurality of logical blocks are written in sequence.

In some implementations, a logical block indicated by the LBA is a next logical block to be written in a zone of the memory device. Storing the padded data in the memory device based on the LBA includes storing the padded data in the memory device such that the data is stored in a physical region of the memory device corresponding to the logical block indicated by the LBA.

In some implementations, the data and other data written in the zone are associated with an identical application.

In some implementations, Zoned Namespace (ZNS) is implemented in the memory system.

In another aspect, a memory system is disclosed. The memory system includes a memory device and a memory controller coupled to the memory device. The memory controller includes a frontend interface configured to receive a write command that indicates that a length of data transferred from a host of the memory system is smaller than a length of a minimal writable data unit of the memory system. The memory controller further includes a processor coupled to the frontend interface and configured to instruct the memory device to store the data responsive to the write command.

In some implementations, the write command includes an effective length field indicative of the length of the data.

In some implementations, the write command further includes a dummy control field indicative of a location of the data within the minimal writable data unit.

In some implementations, the write command further includes an enable field indicative of whether to enable padding the data with dummy data on the memory system.

In some implementations, responsive to the enable field having an enabled value, the padding of the data is enabled on the memory system.

In some implementations, the write command further includes a transfer length field indicative of the length of the minimal writable data unit.

In some implementations, the write command further includes an LBA field indicative of a logical location where the data is to be stored in the memory device.

In some implementations, the frontend interface is further configured to receive the data which has the length indicated by the effective length field from the host.

In some implementations, to instruct the memory device to store the data responsive to the write command, the processor is further configured to determine an LBA based on the LBA field; responsive to the enable field having the enabled value, pad the data with the dummy data to generate padded data based on the transfer length field and the dummy control field, where a length of the padded data is equal to the length of the minimal writable data unit; and instruct the memory device to store the padded data based on the LBA.

In some implementations, a logical space of the memory device is divided into a plurality of zones. Each zone includes a plurality of logical blocks corresponding to a plurality of LBAs, and the plurality of logical blocks are written in sequence.

In some implementations, a logical block indicated by the LBA is a next logical block to be written in a zone of the memory device. To instruct the memory device to store the padded data based on the LBA, the processor is further configured to determine a physical region of the memory device corresponding to the logical block indicated by the LBA; and instruct the memory device to store the padded data in the memory device such that the data is stored in the physical region.

In some implementations, the data and other data written in the zone are associated with an identical application.

In some implementations, ZNS is implemented in the memory system.

In still another aspect, a host includes a processor and a storage interface. The processor is configured to generate a write command that indicates that a length of data to be transferred to a memory system is smaller than a length of a minimal writable data unit of the memory system. The storage interface is coupled to the processor and configured to send the write command to the memory system.

In some implementations, the write command includes an effective length field indicative of the length of the data.

In some implementations, the write command further includes a dummy control field indicative of a location of the data within the minimal writable data unit.

In some implementations, the write command further includes an enable field indicative of whether to enable padding the data with dummy data on the memory system.

In some implementations, the write command further includes a transfer length field indicative of the length of the minimal writable data unit.

In some implementations, the write command further includes an LBA field indicative of a logical location where the data is to be stored in the memory system.

In some implementations, the storage interface is further configured to send the data that has the length indicated by the effective length field to the memory system.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

FIG. 7 illustrates a write command according to some examples.

FIG. 9A illustrates a write command, according to some aspects of the present disclosure.

FIG. 9B illustrates an example implementation of the write command of FIG. 9A, according to some aspects of the present disclosure.

Figure 1:
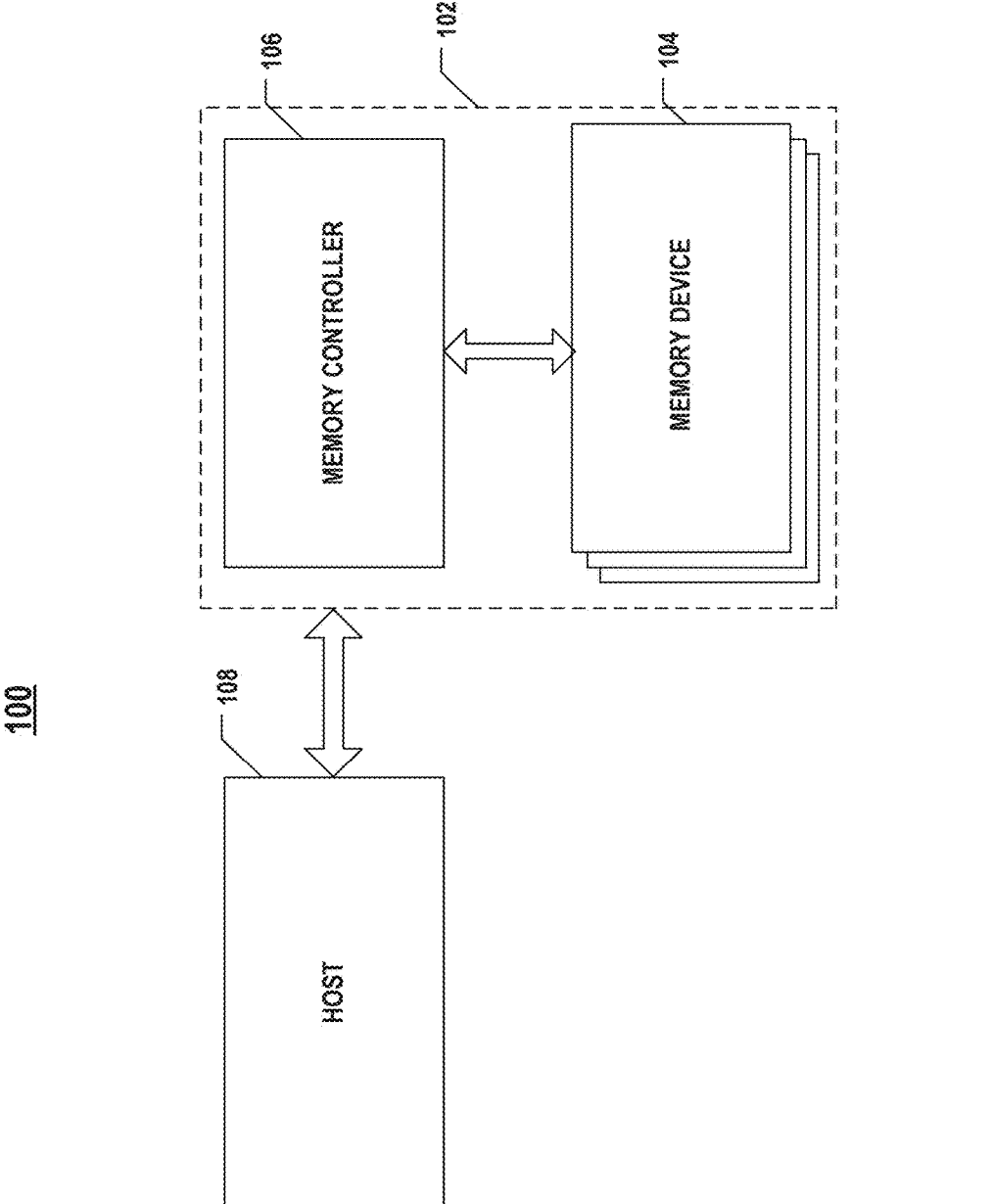
FIG. 1 illustrates a block diagram of a system having a memory device, according to some aspects of the present disclosure.

The present disclosure will be described with reference to the accompanying drawings.

DETAILED DESCRIPTION

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present disclosure.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The NVMe ZNS is emerging as a new storage interface, where a logical address space of a memory system is divided into fixed-sized zones, with each zone including a plurality of logical blocks. The logical blocks in each zone are written sequentially for flash-memory-friendly access. ZNS technology allows incoming data to be grouped based on its usage and access frequency and stored sequentially in independent zones of a non-volatile memory device (such as a NAND Flash memory device). This can significantly reduce the number of write operations and lower the write amplification factor (WAF)—the amount of actual writes performed by the memory device compared to writes initially instructed by a host.

In some applications, a minimal writable data unit of a memory system implemented under ZNS may have a length of 128K or 192K. If a host coupled to the memory system has a set of data to be transferred to the memory system, and a length of the set of data is smaller than the length of the minimal writable data unit, the host needs to pad the set of data with dummy data to generate a set of padded data. A length of the set of padded data is equal to the length of the minimal writable data unit. The set of padded data includes both the set of data and the dummy data. The dummy data can be benign data that does not contain any useful information, but serves to reserve space where real data is nominally present. Next, the host may send a write command including a start logical block address (LBA) to the memory system. The host may also send the set of padded data to the memory system. Then, the memory system may determine a start logical block (e.g., a 4K block) corresponding to the start LBA from a zone of the memory device in the memory system and a logical area starting from the start logical block and having the length of the minimal writable data unit. The logical area may include the start logical block and one or more other logical blocks following the start logical block. The memory system may store the set of padded data in a physical area corresponding to the logical area.

For example, a length of a minimal data unit in a file system of the host can be 4K. A set of data that has a length of 4K can be referred to as "4K data" herein for simplicity. The host may have a large amount of 4K data to be transferred to and stored in the memory system. To write each 4K data into the memory system, the host needs to pad the 4K data with dummy data to generate a set of padded data having the length of the minimal writable data unit of the memory system. For example, the host may pad the 4K data with the dummy data to generate 128K data or 192K data, depending on whether the length of the minimal writable data unit of the memory system is 128K or 192K (e.g., the 128K data includes the 4K data and 124K dummy data, or the 192K data includes the 4K data and 188K dummy data). Then, the host sends the 128K data or the 192K data to the memory system. That is, in order to send the 4K data to the memory system, the host needs to transfer the 128K data or the 192K data to the memory system, where most of the transferred 128K data or 192K data is dummy data. In this case, the overhead for transferring the 4K data from the host to the memory system is large since most of the resources (e.g., bandwidth, time, power, etc.) used to transfer the 128K data or the 192K data is wasted on transferring the dummy data. The performance of the memory system can be degraded, and the power consumption of the memory system can be increased, especially when there is a large volume of 4K data to be transferred.

To address one or more of the aforementioned issues, the present disclosure introduces a solution that can optimize a write command configured to write data from a host into a memory system. One or more new fields (e.g., an enable field, a dummy control field, an effective length field, etc.) can be added to the write command, such that the host does not need to pad the data with dummy data even if the length of the data is smaller than a length of a minimal writable data unit of the memory system. The host only transfers the data (e.g., without dummy data) to the memory system. As a result, the overhead for transferring the data to the memory system can be reduced. For example, if the data has a length of 4K, the overhead can be reduced by 96% if the length of the minimal writable data unit is 128K (or 97.9% if the length of the minimal writable data unit is 192K). When there is a large amount of 4K data to be transferred from the host to the memory system and to be stored in the memory system, the performance of the memory system can be enhanced greatly, and the power consumption of the memory system can be reduced significantly due to the significant reduction in the overhead.

Consistent with some aspects of the present disclosure, the memory system can be implemented under ZNS. Consistent with some aspects of the present disclosure, the write command and the data can be transferred from the host to the memory system under the Small Computer System Interface (SCSI) protocol. The write command can be a write command under SCSI. Consistent with some aspects of the present disclosure, a zero-copy user file system (ZUFS) can be implemented in the memory system. It is contemplated that besides the protocols disclosed herein, the solution disclosed herein is also applicable to any other suitable protocols, which is not limited herein.

Consistent with some aspects of the present disclosure, the minimal writable data unit of the memory system can be the smallest physical space unit to write data into a memory device of the memory system at one time. For example, the logical space of the memory system is divided into zones, with each zone being divided into a plurality of logical blocks. A length of the minimal writable data unit can be multiple times of a length of a logical block. For example, the length of the logical block can be 4K, whereas the length of the minimal writable data unit can be 128K or 192K.

FIG. 1 illustrates a block diagram of a system 100 including a memory system 102, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and memory system 102 having one or more memory devices 104 and a memory controller 106. Host 108 can be a processor of an electronic device, such as a central processing unit (CPU), or a system-on-chip (SoC), such as an application processor (AP). Host 108 can be configured to send or receive data (a.k.a. user data or host data) to or from memory system 102. Memory system 102 can be a storage product integrating memory controller 106 and one or more memory devices 104, such as an SSD.

Memory devices 104 can be any memory devices disclosed in the present disclosure, including non-volatile memory devices, such as NAND Flash memory devices. In some implementations, memory device 104 also includes one or more volatile memory devices, such as dynamic random-access memory (DRAM) devices or static random-access memory (SRAM) devices.

Memory controller 106 is operatively coupled to memory devices 104 and host 108 and is configured to control memory devices 104, according to some implementations. Memory controller 106 can manage the data stored in memory devices 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment with SSDs or embedded multimedia card (eMMCs) used as data storage for mobile devices, such as smartphones, tablets, laptop computers, etc., and enterprise storage arrays. Memory controller 106 can be configured to control operations of memory devices 104, such as read, program/write, and/or erase operations. Memory controller 106 can also be configured to manage various functions with respect to the data stored or to be stored in memory devices 104 including, but not limited to bad-block management, garbage collection, logical-to-physical (L2P) address conversion, wear-leveling, etc. In some implementations, memory controller 106 is further configured to process error correction codes (ECCs) with respect to the data read from or written to memory devices 104. Any other suitable functions may be performed by memory controller 106 as well, for example, formatting memory devices 104. Memory controller 106 can communicate with an external device (e.g., host 108) according to a particular communication protocol. For example, memory controller 106 may communicate with the external device through at least one of various interface protocols, such as a non-volatile memory express (NVMe) protocol, an NVMe-over-fabrics (NVMe-oF) protocol, a PCI-express (PCI-E) protocol, a universal serial bus (USB) protocol, a multimedia card (MMC) protocol, a peripheral component interconnection (PCI) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 2A:
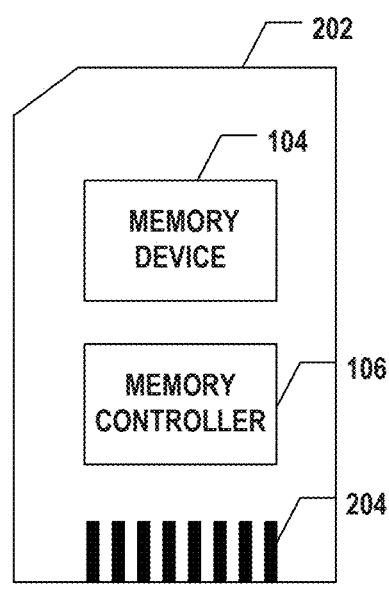
FIG. 2A illustrates a diagram of a memory card having a memory device, according to some aspects of the present disclosure.
Figure 2B:
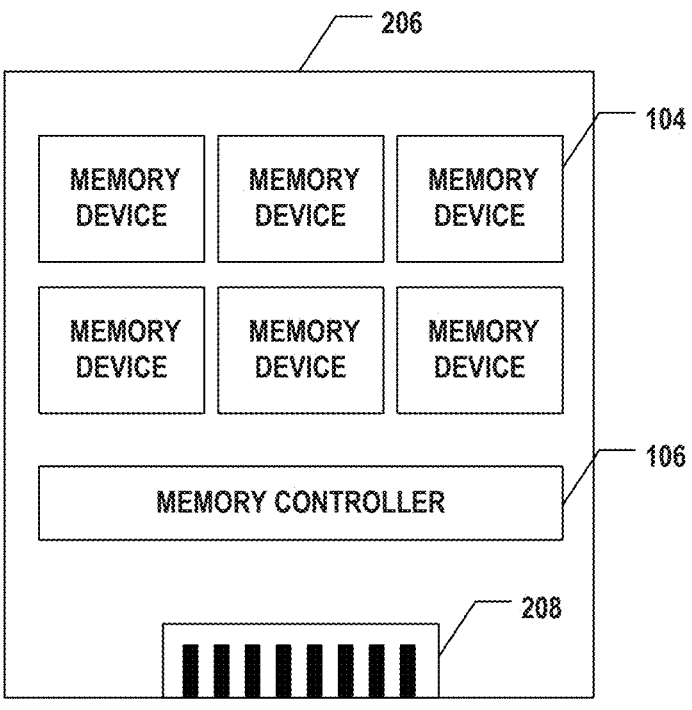
FIG. 2B illustrates a diagram of a solid-state drive (SSD) having a memory device, according to some aspects of the present disclosure.

Memory controller 106 and one or more memory devices 104 can be integrated into various types of storage devices, for example, being included in the same package, such as a universal Flash storage (UFS) package or an eMMC package. That is, memory system 102 can be implemented and packaged into different types of end electronic products. In one example as shown in FIG. 2A, memory controller 106 and a single memory device 104 may be integrated into a memory card 202. Memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 can further include a memory card connector 204 coupling memory card 202 with a host (e.g., host 108 in FIG. 1). In another example as shown in FIG. 2B, memory controller 106 and multiple memory devices 104 may be integrated into an SSD 206. SSD 206 can further include an SSD connector 208 coupling SSD 206 with a host (e.g., host 108 in FIG. 1). In some implementations, the storage capacity and/or the operation speed of SSD 206 is greater than those of memory card 202. In some implementations, memory system 102 is implemented as an SSD 206 that includes both non-volatile memory devices and volatile memory devices as memory devices 104, such as an enterprise SSD.

Figure 3:
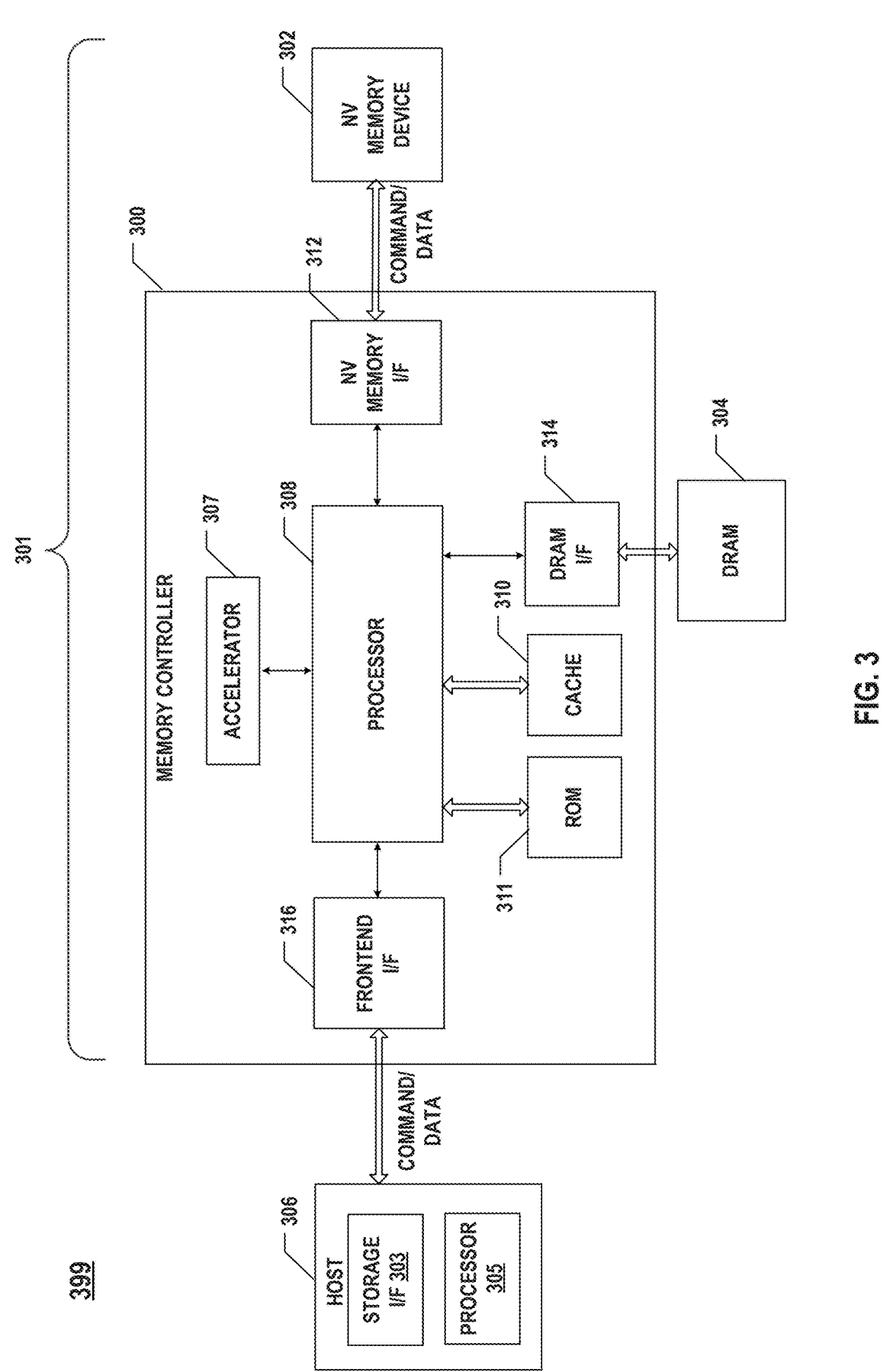
FIG. 3 illustrates a block diagram of another system having a memory device, according to some aspects of the present disclosure.

FIG. 3 illustrates a block diagram of another system 399, according to some aspects of the present disclosure. System 399 may be an example of system 100 in FIG. 1. System 399 may include a host 306 (e.g., an example of host 108 in FIG. 1) and a memory system 301 (e.g., an example of memory system 102 of FIG. 1). Memory system 301 may include a memory controller 300 (e.g., an example of memory controller 106 in FIG. 1) and a non-volatile memory device 302 (e.g., an example of memory device 104 in FIG. 1).

As shown in FIG. 3, memory controller 300 can include a processor 308, an accelerator 307 (e.g., a hardware accelerator), a cache 310, and a read-only memory (ROM) 311. In some implementations, processor 308 is implemented by microprocessors (e.g., digital signal processors (DSPs)) or microcontrollers (a.k.a. microcontroller units (MCUs)) that execute firmware and/or software modules to perform the various functions described herein. The various firmware modules in memory controller 300 described herein can be implemented as firmware codes or instructions stored in ROM 311 and executed by processor 308. In some implementations, processor 308 includes one or more hardware circuits, for example, fixed logic units such as a logic gate, a multiplexer, a flip-flop, a state machine, field-programmable gate arrays (FPGAs), programmable logic devices (PLDs). For example, the hardware circuits may include dedicated circuits performing a given logic function that is known at the time of device manufacture, such as application-specific integrated circuits (ASICs).

As shown in FIG. 3, memory controller 300 can also include various input/output (I/O) interfaces (I/F), such as a non-volatile memory interface 312, a DRAM interface 314, and a frontend interface 316 operatively coupled to non-volatile memory device 302 (e.g., flash memory), DRAM 304 (e.g., an example of volatile memory devices), and host 306, respectively. Non-volatile memory interface 312, DRAM interface 314, and frontend interface 316 can be configured to transfer data, command, clock, or any suitable signals between processor 308 and non-volatile memory device 302, DRAM 304, and host 306, respectively. Non-volatile memory interface 312, DRAM interface 314, and frontend interface 316 can implement any suitable communication protocols facilitating data transfer, communication, and management, such as the NVMe protocol and PCI-E protocol, double data rate (DDR) protocol, to name a few.

As described above, both cache 310 and DRAM 304 may be considered volatile memory devices that can be controlled and accessed by memory controller 300 in a memory system. In some implementations, a cache can be implemented as part of volatile memory devices, for example, by an SRAM and/or DRAM 304. It is understood that although FIG. 3 shows that cache 310 is within memory controller 300 and DRAM 304 is outside of memory controller 300, in some examples both cache 310 and DRAM 304 may be within memory controller 300 or outside of memory controller 300.

Host 306 may include a storage interface (I/F) 303, a processor 305, and a memory (not shown in the figure). Storage interface 303 may be operatively coupled to frontend interface 316 of memory controller 300. Storage interface 303 may be configured to transfer data, command, or any suitable signals between host 306 and memory controller 300. Storage interface 303 can implement any suitable communication protocols facilitating data transfer, communication, and management, such as the NVMe protocol, the PCI-E protocol, SCSI, to name a few. Processor 305 may have a structure like that of processor 308, and the similar description will not be repeated herein.

Figure 4:
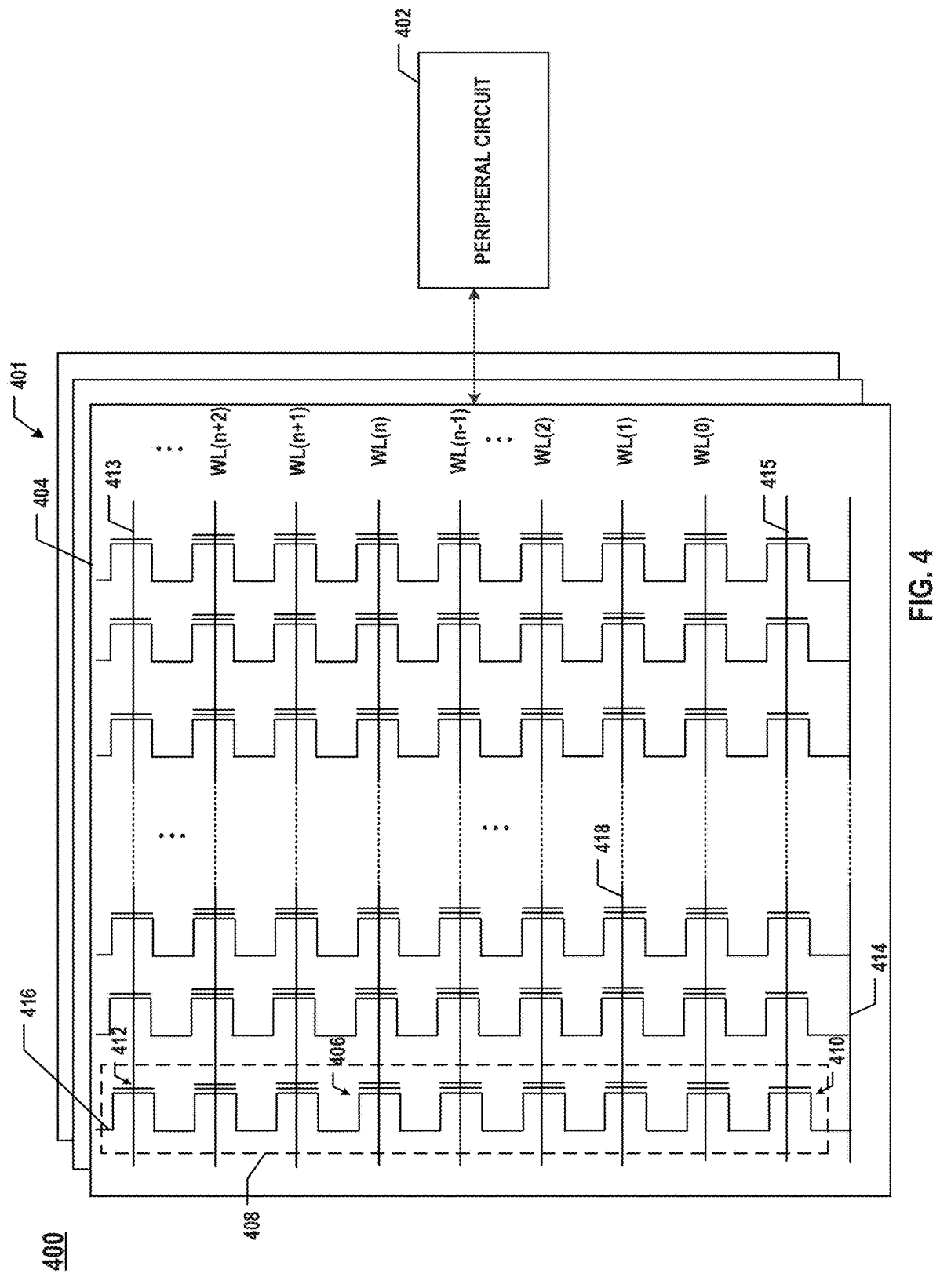
FIG. 4 illustrates a schematic diagram of a memory device including peripheral circuits, according to some aspects of the present disclosure.

FIG. 4 illustrates a schematic diagram of a memory device 400 including peripheral circuits 402, according to some aspects of the present disclosure. Memory device 400 can be an example of memory device 104 in FIG. 1 or memory device 302 of FIG. 3. Memory device 400 can include a memory cell array 401 and peripheral circuits 402 coupled to memory cell array 401. Memory cell array 401 can be a NAND Flash memory cell array in which memory cells 406 are provided in an array of NAND memory strings 408 each extending vertically above a substrate (not shown). In some implementations, each NAND memory string 408 includes a plurality of memory cells 406 coupled in series and stacked vertically. Each memory cell 406 can hold a continuous, analog value, such as an electrical voltage or charge, that depends on the number of electrons trapped within a region of memory cell 406. Each memory cell 406 can be either a floating gate type of memory cell including a floating-gate transistor or a charge trap type of memory cell including a charge-trap transistor.

In some implementations, each memory cell 406 is a single-level cell (SLC) that has two possible memory states and thus, can store one bit of data. For example, the first memory state "0" can correspond to a first range of voltages, and the second memory state "1" can correspond to a second range of voltages. In some implementations, each memory cell 406 is a multi-level cell (MLC) that is capable of storing more than a single bit of data in more than four memory states. For example, the MLC can store two bits per cell, three bits per cell (also known as TLC), or four bits per cell (also known as QLC). Each MLC can be programmed to assume a range of possible nominal storage values. In one example, if each MLC stores two bits of data, then the MLC can be programmed to assume one of three possible programming levels from an erased state by writing one of three possible nominal storage values to the cell. A fourth nominal storage value can be used for the erased state.

As shown in FIG. 4, each NAND memory string 408 can also include a source select gate (SSG) transistor 410 at its source end and a drain select gate (DSG) transistor 412 at its drain end. SSG transistor 410 and DSG transistor 412 can be configured to activate select NAND memory strings 408 (columns of the array) during read and program operations. In some implementations, the sources of NAND memory strings 408 in the same block 404 are coupled through a same source line (SL) 414, e.g., a common SL. In other words, all NAND memory strings 408 in the same block 404 have an array common source (ACS), according to some implementations. The drain of each NAND memory string 408 is coupled to a respective bit line 416 from which data can be read or written via an output bus (not shown), according to some implementations. In some implementations, each NAND memory string 408 is configured to be selected or deselected by applying a DSG select voltage or a DSG unselect voltage to the gate of respective DSG transistor 412 through one or more DSG lines 413 and/or by applying an SSG select voltage or an SSG unselect voltage to the gate of respective SSG transistor 410 through one or more SSG lines 415.

As shown in FIG. 4, NAND memory strings 408 can be organized into multiple blocks 404, each of which can have a common source line 414, e.g., coupled to an ACS. In some implementations, each block 404 is the basic data unit for erase operations, i.e., all memory cells 406 on the same block 404 are erased at the same time. To erase memory cells 406 in a select block 404, source lines 414 coupled to select block 404 as well as unselect blocks 404 in the same plane as select block 404 can be biased with an erase voltage (Vers), such as a high positive voltage (e.g., 20 V or more). Memory cells 406 of adjacent NAND memory strings 408 can be coupled through word lines 418 that select which row of memory cells 406 is affected by read and program operations. Each word line 418 can include a plurality of control gates (gate electrodes) at each memory cell 406 coupled to word line 418 and a gate line coupling the control gates. With reference to FIG. 4, a plurality of word lines WL(0), WL(1), WL(2), . . . , WL(n−1), WL(n), WL(n+1), and WL(n+2) are illustrated, with n being a positive integer.

Figure 5:
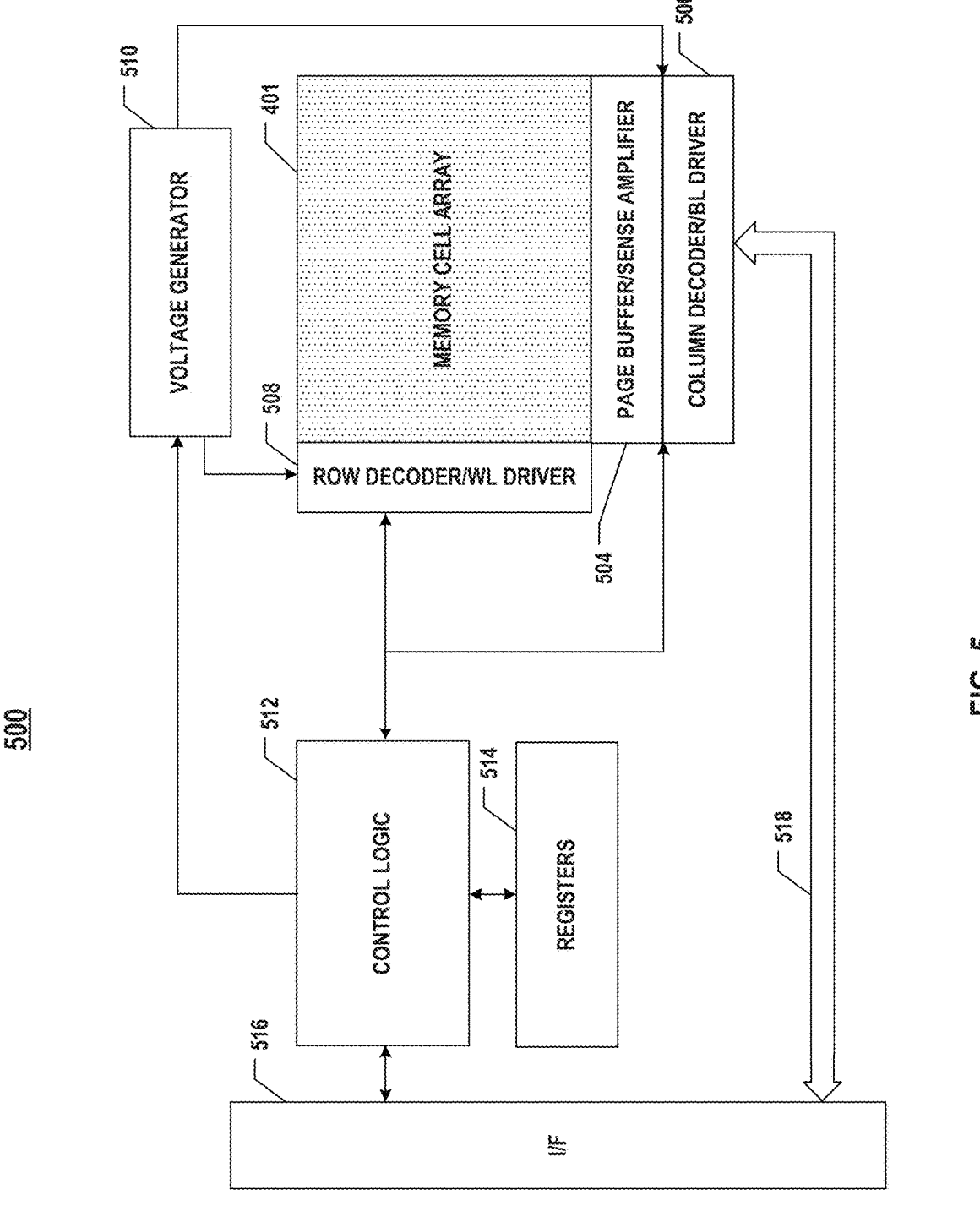
FIG. 5 illustrates a block diagram of a memory device including a memory cell array and peripheral circuits, according to some aspects of the present disclosure.

Peripheral circuits 402 can be coupled to memory cell array 401 through bit lines 416, word lines 418, source lines 414, SSG lines 415, and DSG lines 413. Peripheral circuits 402 can include any suitable analog, digital, and mixed-signal circuits for facilitating the operations of memory cell array 401 by applying and sensing voltage signals and/or current signals to and from each target memory cell 406 through bit lines 416, word lines 418, source lines 414, SSG lines 415, and DSG lines 413. Peripheral circuits 402 can include various types of peripheral circuits formed using metal-oxide-semiconductor (MOS) technologies. For example, FIG. 5 illustrates some peripheral circuits including a page buffer/sense amplifier 504, a column decoder/bit line driver 506, a row decoder/word line driver 508, a voltage generator 510, control logic 512, registers 514, an interface 516, and a data bus 518. It is understood that in some examples, additional peripheral circuits not shown in FIG. 5 may be included as well.

Page buffer/sense amplifier 504 can be configured to read and program (write) data from and to memory cell array 401 according to the control signals from control logic 512. In one example, page buffer/sense amplifier 504 may store one page of program data (write data) to be programmed into a page of memory cell array 401. In another example, page buffer/sense amplifier 504 may verify programmed target memory cells 406 in each program/verify loop (cycle) in a program operation to ensure that the data has been properly programmed into memory cells 406 coupled to select word lines 418. In still another example, page buffer/sense amplifier 504 may also sense the low power signals from bit line 416 that represents a data bit stored in memory cell 406 and amplify the small voltage swing to recognizable logic levels in a read operation. In program operations, page buffer/sense amplifier 504 can include storage modules (e.g., latches, caches, registers, etc.) for temporarily storing a set of N-bits data (e.g., in the form of gray codes) received from data bus 518 and providing the set of N-bits data to a corresponding target memory cell 406 through the corresponding bit line 416 in each program pass of a multi-pass program operation.

Column decoder/bit line driver 506 can be configured to be controlled by control logic 512 and select one or more NAND memory strings 408 by applying bit line voltages generated from voltage generator 510. Row decoder/word line driver 508 can be configured to be controlled by control logic 512 and select/deselect blocks 404 of memory cell array 401 and select/deselect word lines 418 of block 404. Row decoder/word line driver 508 can be further configured to drive word lines 418 using word line voltages generated from voltage generator 510. In some implementations, row decoder/word line driver 508 can also select/deselect and drive SSG lines 415 and DSG lines 413 as well. Voltage generator 510 can be configured to be controlled by control logic 512 and generate the word line voltages (e.g., read voltage, program voltage, channel pass voltage, local voltage, verify voltage, etc.), bit line voltages, and source line voltages to be supplied to memory cell array 401.

Control logic 512 can be coupled to each peripheral circuit described above and configured to control the operations of each peripheral circuit. Registers 514 can be coupled to control logic 512 and include status registers, command registers, and address registers for storing status information, command operation codes (OP codes), and command addresses for controlling the operations of each peripheral circuit. Interface 516 can be coupled to control logic 512 and act as a control buffer to buffer and relay control commands received from a host (e.g., 108 in FIG. 1) to control logic 512 and status information received from control logic 512 to the host. Interface 516 can also be coupled to column decoder/bit line driver 506 via data bus 518 and act as a data input/output (I/O) interface and a data buffer to buffer and relay the data to and from memory cell array 401.

Figure 6A:
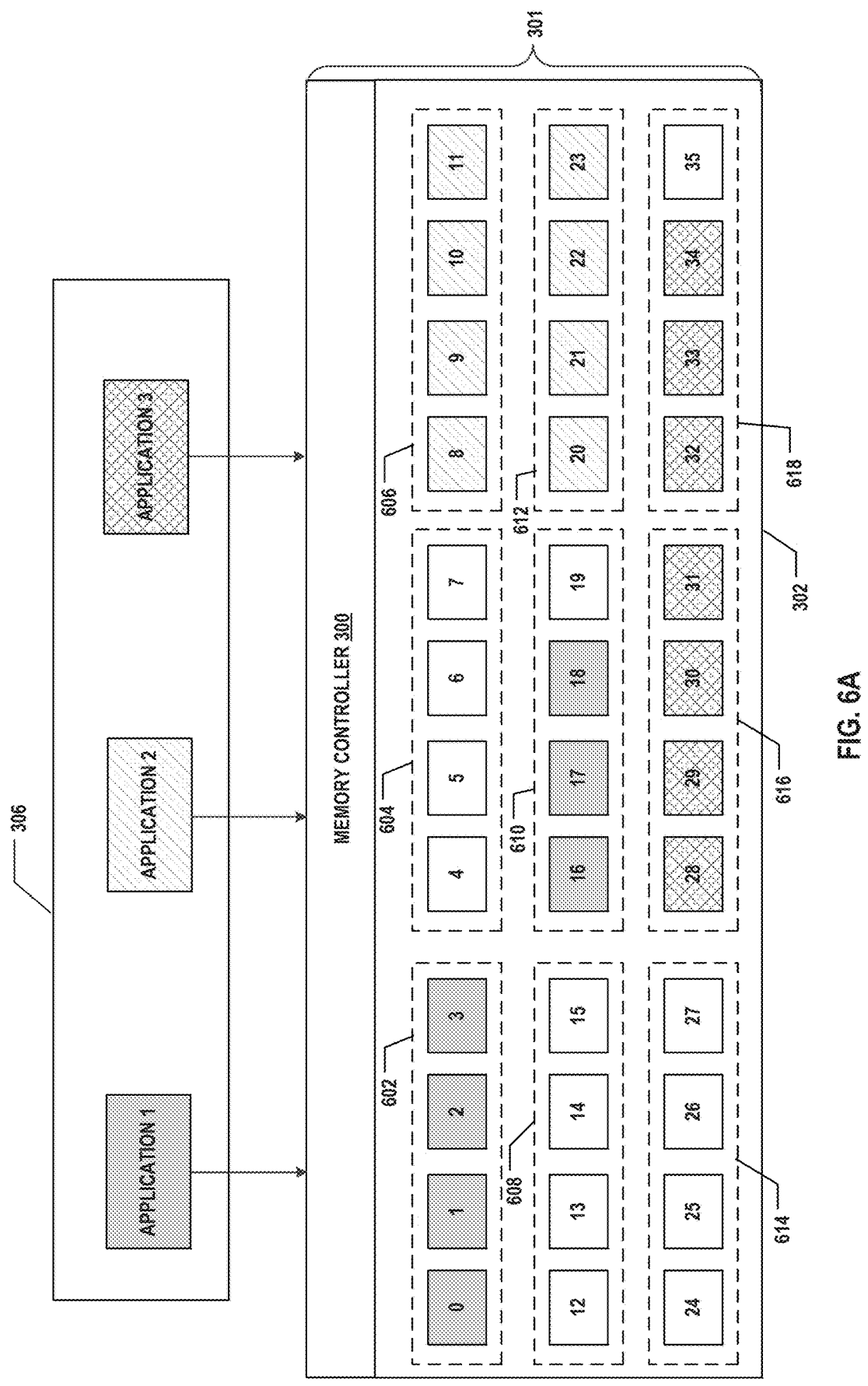
FIG. 6A illustrates an example of storing data in a memory system, according to some aspects of the present disclosure.
Figure 6B:
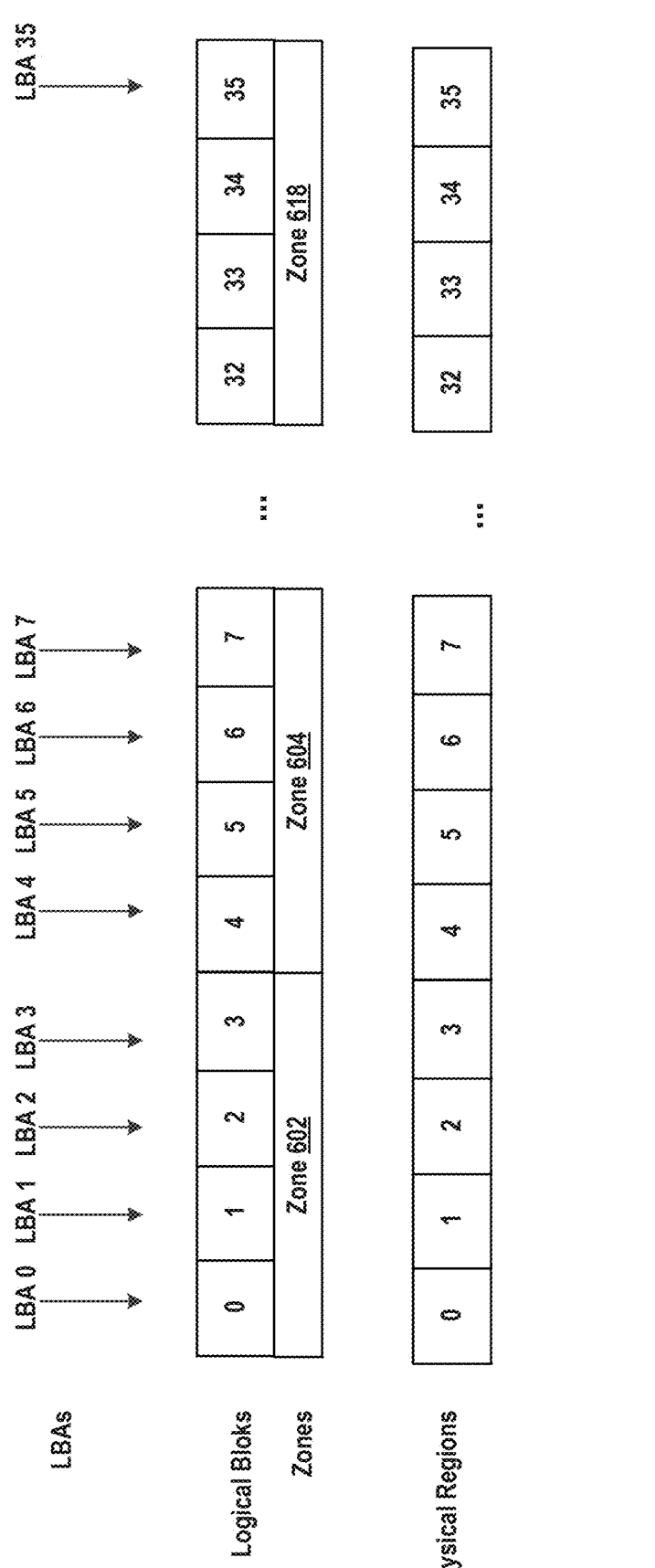
FIG. 6B illustrates example zones in a memory system, according to some aspects of the present disclosure.

FIG. 6A illustrates an example of storing data in a memory system (e.g., memory system 301), according to some aspects of the present disclosure. FIG. 6B illustrates example zones in memory system 301, according to some aspects of the present disclosure. FIGS. 6A-6B are described below together. Memory system 301 may include memory controller 300 and memory device 302 of FIG. 3. Memory system 301 may be implemented using ZNS or any other suitable protocol, which is not limited herein.

Consistent with some aspects of the present disclosure, a logical space of memory device 302 can be divided into a plurality of zones, with each zone including a plurality of logical blocks corresponding to a plurality of LBAs. The plurality of logical blocks in each zone can be written in sequence. The plurality of logical blocks in each zone may correspond to a plurality of physical regions of memory device 302, respectively. Each physical region may be a physical block or a physical page which may have the same size as a corresponding logical block.

Each zone may be associated with one or more of the following parameters: a zone capacity (ZCAP) indicating the maximum number of logical blocks that are available to be written with user data when the zone is in the empty state; a zone start logical block address (ZSLBA) indicating an address of a zone start logical block (e.g., the lowest logical block) for the zone; a write pointer (WP) indicating a next available logical block to be written with user data in the zone. In some implementations, the plurality of logical blocks in each zone may include a zone start logical block and one or more other logical blocks. The zone start logical block in the zone can be identified by a corresponding ZSLBA of the zone. Each of the one or more other logical blocks in the zone can be identified by the ZSLBA and a corresponding shift of the logical block from the zone start logical block.

For example, with reference to FIGS. 6A-6B, the logical space of memory device 302 can be divided into a plurality of zones 602, 604, 606, 608, 610, 612, 614, 616, and 618 (e.g., 9 zones). Each zone includes 4 logical blocks corresponding to 4 LBAs, respectively (e.g., ZCAP for each zone is equal to 4). For example, zone 602 may include logical blocks 0-3 corresponding to LBA 0, LBA 1, LBA 2, and LBA 3, respectively. Zone 604 may include logical blocks 4-7 corresponding to LBA 4, LBA 5, LBA 6, and LBA 7, respectively. The 4 logical blocks in each zone can be written in sequence and may correspond to 4 physical regions of memory device 302, respectively. For example, logical blocks 0-3 in zone 602 may correspond to physical regions 0-3, respectively. Logical blocks 4-7 in zone 604 may correspond to physical regions 4-7, respectively.

In some implementations, different types of user data (or host data) can be allocated to different zones, and each zone includes only one type of user data (or host data). For example, with reference to FIG. 6A, user data of Application 1 is allocated to zones 602 and 610, and stored in physical regions 0-3 and 16-18, which correspond to logical blocks 0-3 of zone 602 and logical blocks 16-18 of zone 610, respectively. User data of Application 2 is allocated to zones 606 and 612, and stored in physical regions 8-11 and 20-23, which correspond to logical blocks 8-11 of zone 606 and logical blocks 20-23 of zone 612, respectively. User data of Application 3 is allocated to zones 616 and 618, and stored in physical regions 28-34, which correspond to logical blocks 28-31 of zone 616 and logical blocks 32-34 of zone 618, respectively.

Figures 6C, 6D:
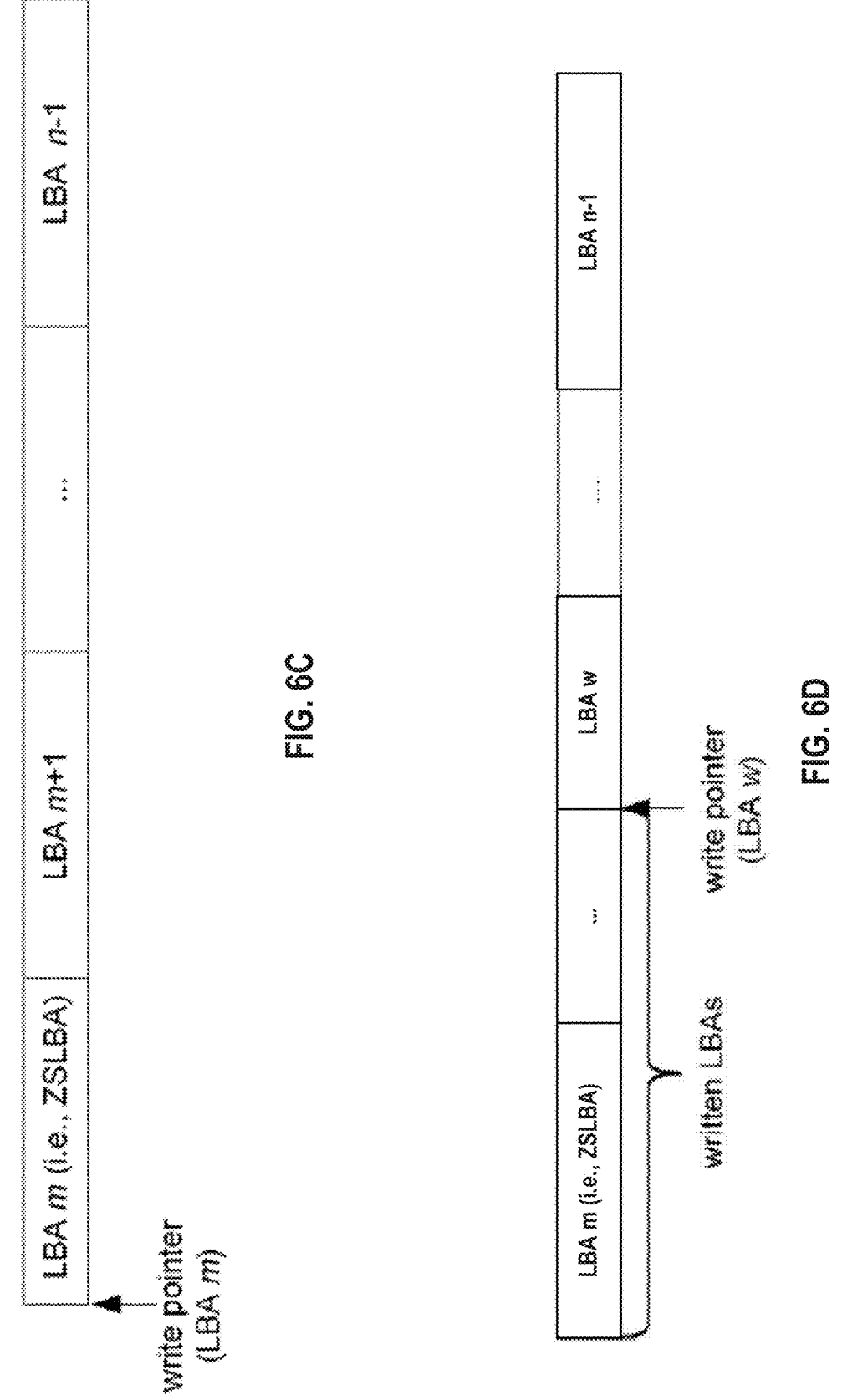
FIG. 6C illustrates a write pointer in an empty zone, according to some aspects of the present disclosure.
FIG. 6D illustrates a write pointer in a partially written zone, according to some aspects of the present disclosure.

FIG. 6C illustrates a write pointer in an empty zone, according to some aspects of the present disclosure. The zone includes logical blocks LBA m, LBA m+1, . . . , LBA n−1. A ZSLBA for the zone is LBA m. Since this zone is empty, a next logical block to be written in the zone is LBA m, and the write pointer of this zone is also LBA m.

FIG. 6D illustrates a write pointer in a partially written zone, according to some aspects of the present disclosure. The zone includes logical blocks LBA m, . . . , LBA w, . . . , LBA n−1. A ZSLBA for the zone is LBA m. Since the logical blocks prior to LBA w are already written, a next logical block to be written is LBA w, and the write pointer of this zone is LBA w.

FIG. 7 illustrates a write command according to some examples. The write command may be used to write data into a memory system. The write command, as well as the data, can be transferred from a host to the memory system. The write command may include various fields, as illustrated in FIG. 7. For example, the write command may include an operation code field, which indicates an operation code corresponding to a write operation. The write command may also include a force unit access (FUA) field. When the FUA field is set to 1, the data from the host is written into a memory device of the memory system directly (without caching the data into a cache of the memory system before writing it into the memory device). When the FUA field is set to 0, the data from the host is written into the cache of the memory system first and flushed into the memory device of the memory system afterward. The write command may also include an LBA field, which indicates an address of a start logical location (e.g., a start logical block) where the data is to be written into the memory device.

The write command may further include a transfer length field, which indicates the length of the data transferred from the host to the memory system. The length of the data transferred from the host to the memory system may be one or more times of a length of a minimal writable data unit of the memory system. For example, if the length of the minimal writable data unit of the memory system is 128K, the length of the data transferred from the host to the memory system may be one or more times of 128K (e.g., integer multiples of 128K). If the length of the data is not integer multiples of 128K, the data can be padded with dummy data to have a length of integer multiples of 128K before being transferred from the host to the memory system. For example, as described above, to write 4K data into the memory system, the host needs to pad the 4K data with dummy data to generate 128K data. Then, the host transfers the 128K data to the memory system (e.g., the transfer length field indicates that the length of the data being transferred from the host to the memory system is 128K). In this case, most of the transferred data (e.g., 124K out of the 128K data) is dummy data. The overhead for transferring the 4K data from the host to the memory system is large. As a result, the performance of the memory system can be degraded, and the power consumption of the memory system can be increased, especially when there is a large volume of 4K data to be transferred.

Figure 8:
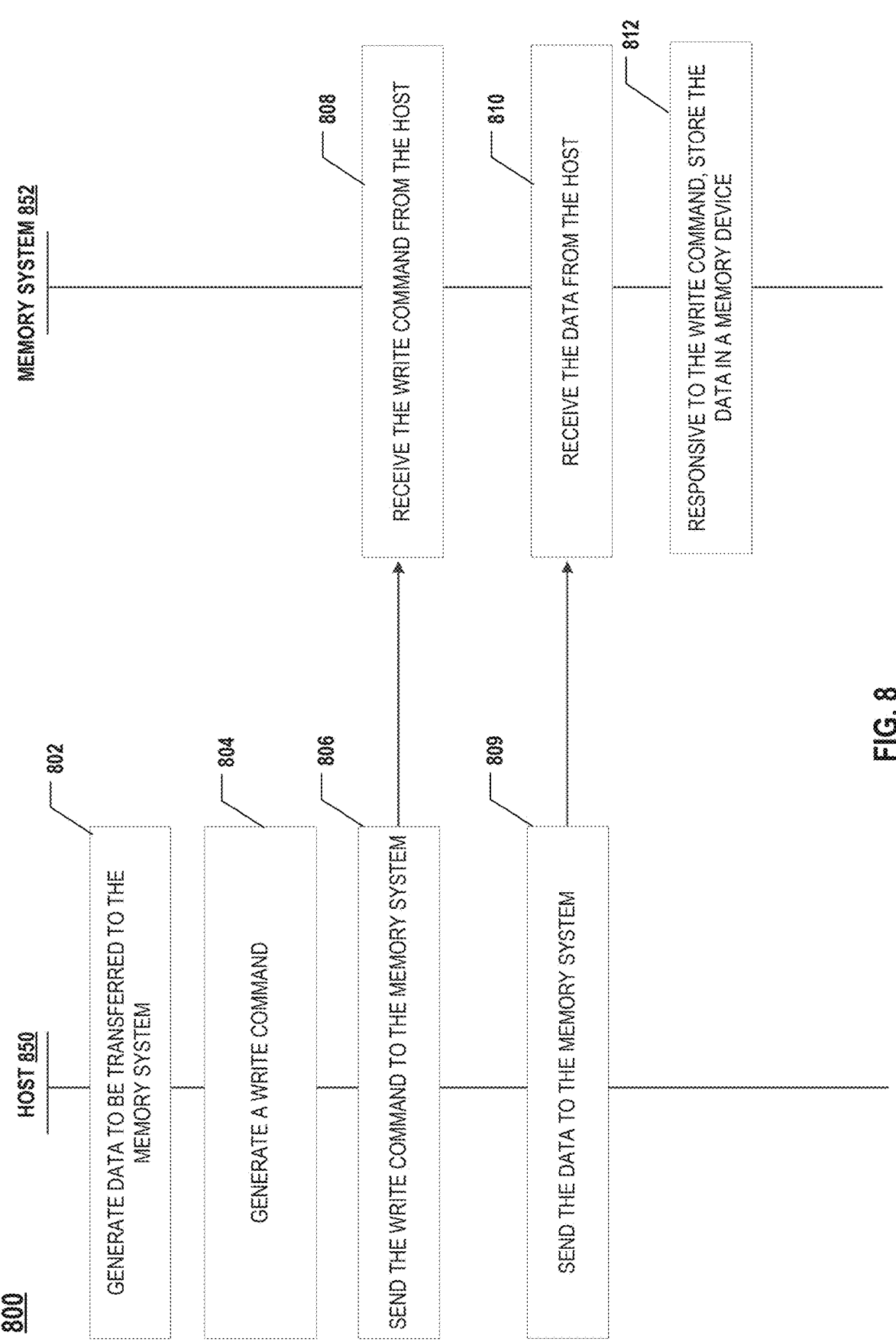
FIG. 8 illustrates a process of operating a memory system, according to some aspects of the present disclosure.

FIG. 8 illustrates a process 800 of operating a memory system 852, according to some aspects of the present disclosure. Memory system 852 can be any memory system disclosed herein, such as memory system 102 of FIG. 1 or memory system 301 of FIG. 3. A host 850 can be communicatively coupled to memory system 852. Host 850 can be any host disclosed herein, such as host 108 of FIG. 1 or host 306 of FIG. 3. FIG. 9A illustrates a write command implemented in host 850 and/or memory system 852, according to some aspects of the present disclosure. FIG. 9B illustrates an example implementation of the write command of FIG. 9A, according to some aspects of the present disclosure. FIGS. 8 and 9A-9B are described below together.

Process 800 may begin with operation 802 in which host 850 (e.g., a processor of host 850) may generate data to be transferred to memory system 852. The data can be user data (or host data) to be transferred to and stored in memory system 852. The data does not include dummy data and can be referred to as effective data herein. In some implementations, the length of the data to be transferred from host 850 to memory system 852 can be smaller than a length of a minimal writable data unit of memory system 852.

Process 800 may proceed to operation 804 in which host 850 (e.g., the processor of host 850) may generate a write command. The write command may indicate that the length of the data to be transferred to memory system 852 can be smaller than the length of the minimal writable data unit of memory system 852. For example, with reference to FIG. 9A, the write command may include 18 bytes (Byte 0, Byte 1, . . . , Byte 17). The write command may include an effective length field indicative of the length of the data (at Byte 16). The write command may further include at least one of the following: (a) a dummy control field indicative of a location of the data within the minimal writable data unit (at Bits 0-6 of Byte 15); (b) an enable field indicative of whether to enable padding the data with dummy data on memory system 852 (at Bit 7 of Byte 15); (c) a transfer length field indicative of a length of the minimal writable data unit (from Byte 10 to Byte 13); or (d) an LBA field indicative of a logical location where the data is to be stored in memory system 852 (from Byte 2 to Byte 9). Unlike the transfer length field of FIG. 7 which indicates a length of data being transferred from the host to the memory system, the transfer length field of FIG. 9A indicates the length of the minimal writable data unit of memory system 852.

Responsive to the enable field having an enabled value (e.g., 1), the padding of the data is enabled on memory system 852. Consistent with some aspects of the present disclosure, when the length of the data to be transferred from host 850 to memory system 852 is smaller than the length of the minimal writable data unit of memory system 852, the enable field is configured to have the enabled value. As a result, only the data (without dummy data) is transferred from host 850 to memory system 852, and subsequently, memory system 852 may pad the transferred data with dummy data, as described below in more detail. Or, responsive to the enable field having a disabled value (e.g., 0), the padding of the data is disabled on memory system 852. In this case, if the length of the data to be transferred from host 850 to memory system 852 is smaller than the length of the minimal writable data unit of memory system 852, the padding of the data is enabled on host 850. That is, the padding of the data is performed by host 850. However, if the length of the data to be transferred from host 850 to memory system 852 is one or more times of the length of the minimal writable data unit of memory system 852, there is no need to pad the data with dummy data on host 850 or memory system 852.

In a further example, with reference to FIG. 9B, the data to be transferred from host 850 to memory system 852 may have a length of 4K. The length of the minimal writable data unit of memory system 852 (e.g., as well as a length of at least one logical block of memory system 852) can be 128K. Then, the enable field of the write command is configured to have the enabled value (ENABLE=1), such that only the 4K data (without dummy data) is transferred from host 850 to memory system 852. Then, the effective length field of the write command may have a value of 1 (corresponding to one time of 4K). The transfer length field of the write command may have a value of 32 (corresponding to 32 times of 4K since 32×4K=128K). The LBA field of the write command may have a value of 0x00, indicating that the data is to be stored in a logical block having the address 0x00. The minimal writable data unit can be divided into 32 subblocks (e.g., subblock 0, subblock 1, . . . , subblock 31) each having a length of 4K. The dummy control field of the write command may have a value of 0, indicating that the data is to be placed in subblock 0 of the minimal writable data unit (e.g., the first 4K of the minimal writable data unit). Alternatively, if the dummy control field has a value of 1, the data can be placed in subblock 1 of the minimal writable data unit (e.g., the second 4K of the minimal writable data unit).

Process 800 may proceed to operation 806 in which host 850 (e.g., a storage interface of host 850) may send the write command to memory system 852. As a result, memory system 852 may receive the write command from host 850 at operation 808. For example, memory system 852 may include a memory controller (e.g., memory controller 300) and a memory device (e.g., memory device 302). A frontend interface of the memory controller may receive the write command from host 850.

Process 800 may proceed to operation 809 in which host 850 (e.g., a storage interface of host 850) may send the data which has the length indicated by the effective length field of the write command to memory system 852. As a result, memory system 852 may receive the data from host 850 at operation 810. For example, the frontend interface of the memory controller may receive the data that has the length indicated by the effective length field from host 850.

Process 800 may proceed to operation 812 in which memory system 852 may store the data in the memory device responsive to the write command. In some implementations, the memory controller (e.g., a processor of the memory controller) may instruct the memory device to store the data responsive to the write command.

Consistent with some aspects of the present disclosure, the memory controller may be configured to write data to multiple dies of the memory device in parallel to improve the write performance of the memory system. A length of the data delivered to the memory device in parallel may be referred to as a length of the minimal writable data unit. The length of the minimal writable data unit can be any suitable value, which is not limited herein. For example, the length of the minimal writable data unit may be 128K or 192K.

Specifically, the memory controller may determine an LBA based on the LBA field of the write command. A logical block indicated by the LBA can be a next available (or empty) logical block in a zone of the memory device (e.g., sequential write is applied in the zone, and all prior logical blocks (if there is any) before the logical block in the same zone are already written or occupied). For example, the LBA may indicate the write pointer of the zone, which indicates a next available logical block to be written in the zone. The data to be written into the logical block of the zone and other data that is already written into the prior logical blocks in the same zone are associated with the same application (e.g., the same type of host data).

Next, responsive to the enable field of the write command having the enabled value, the memory controller may pad the data with dummy data to generate padded data based on the transfer length field and the dummy control field. For example, the length of the padded data may be equal to the length of the minimal writable data unit indicated by the transfer length field. The data is to be placed in a location indicated by the dummy control field within the minimal writable data unit.

For example, with reference to FIG. 9B again, the minimal writable data unit has a length of 128K indicated by the transfer length field, and the data has a length of 4K indicated by the effective length field. Since the dummy control field has a value of 0, the data is to be placed in subblock 0 of the minimal writable data unit (e.g., the first 4K of the minimal writable data unit). Thus, the padded data generated by the memory controller may have a length of 128K, with the first 4K of the padded data to be the data received from host 850 and the remaining 124K of the padded data to be the dummy data. Alternatively, if the dummy control field has a value of 1, the data can be placed in subblock 1 of the minimal writable data unit (e.g., the second 4K of the minimal writable data unit). In this case, the padded data generated by the memory controller may also have a length of 128K, with the second 4K of the padded data to be the data received from host 850 and the remaining 124K of the padded data to be the dummy data.

Subsequently, the memory controller may instruct the memory device to store the padded data based on the LBA. For example, the memory controller may determine a physical region corresponding to the logical block indicated by the LBA, and may determine a physical area including the physical region. For example, the physical area may have a size equal to the length of the minimal writable data unit (e.g., 128K), whereas the physical region may have a size of 4K. In another example, the memory device may include multiple dies, and the physical area may include multiple physical regions from the multiple dies. The multiple physical regions include the physical region corresponding to the logical block indicated by the LBA. The memory controller may instruct the memory device to store the padded data in the physical area such that the data is stored in the physical region corresponding to the logical block indicated by the LBA.

Figure 10:
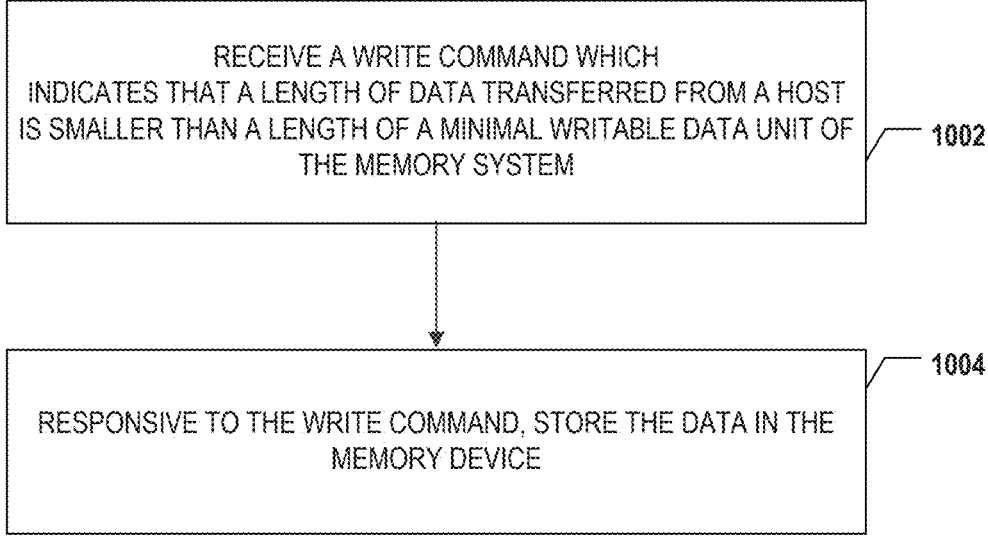
FIG. 10 illustrates a flowchart of a method for operating a memory system, according to some aspects of the present disclosure.

FIG. 10 illustrates a flowchart of a method 1000 for operating a memory system, according to some aspects of the present disclosure. The memory system may be any suitable memory system disclosed herein, such as memory system 102, 301, or 852. Method 1000 may be implemented by components of the memory system (e.g., frontend interface 316, processor 308, etc., of memory system 301). It is understood that the operations shown in method 1000 may not be exhaustive and that other operations can be performed as well before, after, or between any of the illustrated operations. Further, some of the operations may be performed simultaneously, or in a different order than shown in FIG. 10.

Referring to FIG. 10, method 1000 starts at operation 1002, in which a write command is received, which indicates that a length of data transferred from a host is smaller than a length of a minimal writable data unit of the memory system. In some implementations, the write command can be received from the host by a frontend interface of the memory system.

In some implementations, the write command may include at least one of the following: (a) an effective length field indicative of the length of the data; (b) a dummy control field indicative of a location of the data within the minimal writable data unit; (c) an enable field indicative of whether to enable padding the data with dummy data on the memory system; (d) a transfer length field indicative of a length of the minimal writable data unit; or (e) an LBA field indicative of a logical location where the data is to be stored in the memory device. The enable filed can be set to be the enabled value (ENABLE=1) since the length of the data is smaller than the length of the minimal writable data unit.

In some implementations, the data that has the length indicated by the effective length field can be received by the frontend interface of the memory system from the host.

Method 1000 proceeds to operation 1004, as illustrated in FIG. 10, in which responsive to the write command, the data is stored in the memory device of the memory system.

For example, a processor of the memory system may determine an LBA based on the LBA field of the write command. Responsive to the enable field having the enabled value, the processor of the memory system may pad the data with dummy data to generate padded data based on the transfer length field and the dummy control field of the write command. A length of the padded data can be equal to the length of the minimal writable data unit. The processor of the memory system may determine a physical area including a physical region of the memory device corresponding to a logical block indicated by the LBA. The logical block can be a next empty logical block to be written in a zone of the memory device. The processor of the memory system may instruct the memory device to store the padded data in the physical area such that the data is stored in the determined physical region.

Figure 11:
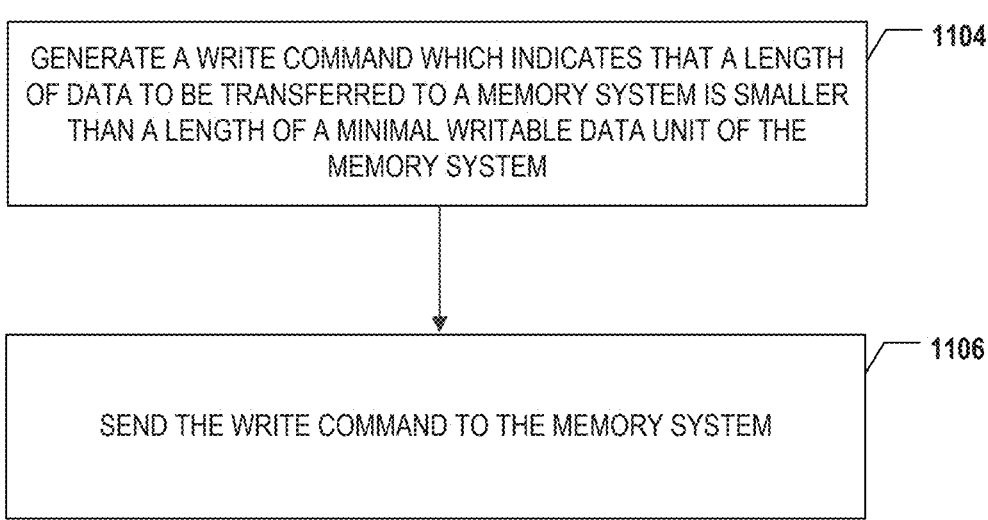
FIG. 11 illustrates a flowchart of a method performed by a host, according to some aspects of the present disclosure.

FIG. 11 illustrates a flowchart of a method 1100 performed by a host, according to some aspects of the present disclosure. The host may be any suitable host disclosed herein, such as host 108, host 306, or host 850. Method 1100 may be implemented by components of the host (e.g., storage interface 303 or processor 305 of host 306). It is understood that the operations shown in method 1100 may not be exhaustive and that other operations can be performed as well before, after, or between any of the illustrated operations. Further, some of the operations may be performed simultaneously, or in a different order than shown in FIG. 11.

Referring to FIG. 11, method 1100 starts at operation 1102, in which a write command is generated, which indicates that a length of data to be transferred to a memory system is smaller than a length of a minimal writable data unit of the memory system. For example, a processor of the host may generate the write command.

Method 1100 proceeds to operation 1104, as illustrated in FIG. 11, in which the write command is sent to the memory system. For example, a storage interface of the host may send the write command to the memory system.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A method of operating a memory system, comprising:
   receiving a write command that indicates that a length of data transferred from a host is smaller than a length of a minimal writable data unit of the memory system; and
   responsive to the write command, store the data in the memory system,
   wherein the write command comprises at least one of:
      a dummy control field indicative of a location of the data within the minimal writable data unit;
      an enable field indicative of whether to enable padding the data with dummy data on the memory system;
      a transfer length field indicative of the length of the minimal writable data unit; or
      a logical block address (LBA) field indicative of a logical location where the data is to be stored in the memory system.

2. The method of claim 1, wherein the write command further comprises an effective length field indicative of the length of the data.

3. The method of claim 1, wherein:

responsive to the enable field indicative having an enabled value, the padding of the data is enabled on the memory system.

4. The method of claim 2, wherein the write command is received by a frontend interface of the memory system, and the method further comprises:

receiving, by the frontend interface, the data that has the length indicated by the effective length field indicative from the host.

5. The method of claim 1, wherein responsive to the write command, store the data in the memory system comprises:

determining an LBA based on the LBA field indicative;

responsive to the enable field indicative having an enabled value, padding the data with the dummy data to generate padded data based on the transfer length field indicative and the dummy control field indicative, wherein a length of the padded data is equal to the length of the minimal writable data unit; and storing the padded data in the memory system based on the LBA.

6. The method of claim 5, wherein:

a logical space of the memory system is divided into a plurality of zones; and each zone includes a plurality of logical blocks corresponding to a plurality of LBAs, and the plurality of logical blocks are written in sequence.

7. The method of claim 6, wherein:

a logical block indicated by a LBA is a next logical block to be written in a zone of the memory device system; and storing the padded data in the memory system based on the LBA comprises storing the padded data in the memory system such that the data is stored in a physical region corresponding to the logical block indicated by the LBA.

8. The method of claim 7, wherein the data and other data written in the zone are associated with an identical application.

9. The method of claim 1, wherein Zoned Namespace (ZNS) is implemented in the memory system.

10. A memory system, comprising:

a memory device; and a memory controller coupled to the memory device, comprising:

a frontend interface configured to receive a write command that indicates that a length of data transferred from a host is smaller than a length of a minimal writable data unit of the memory system; and a processor coupled to the frontend interface and configured to instruct the memory device to store the data responsive to the write command, wherein the write command comprises at least one of:

a dummy control field indicative of a location of the data within the minimal writable data unit;

an enable field indicative of whether to enable padding the data with dummy data on the memory device;

a transfer length field indicative of the length of the minimal writable data unit; or a logical block address (LBA) field indicative of a logical location where the data is to be stored in the memory device.

11. The memory system of claim 10, wherein the write command further comprises:

an effective length field indicative of the length of the data.

12. The memory system of claim 11, wherein the frontend interface is further configured to:

receive the data that has the length indicated by the effective length field indicative from the host.

13. The memory system of claim 10, wherein to instruct the memory device to store the data responsive to the write command, the processor is further configured to:

determine an LBA based on the LBA field indicative;

responsive to the enable field indicative having an enabled value, pad the data with the dummy data to generate padded data based on the transfer length field indicative and the dummy control field indicative, wherein a length of the padded data is equal to the length of the minimal writable data unit; and instruct the memory device to store the padded data based on the LBA.

14. The memory system of claim 13, wherein:

a logical space of the memory device is divided into a plurality of zones; and each zone includes a plurality of logical blocks corresponding to a plurality of LBAs, and the plurality of logical blocks are written in sequence.

15. The memory system of claim 14, wherein:

a logical block indicated by a LBA is a next logical block to be written in a zone of the memory device; and to instruct the memory device to store the padded data based on the LBA, the processor is further configured to:

determine a physical region of the memory device corresponding to the logical block indicated by the LBA; and instruct the memory device to store the padded data in the memory device such that the data is stored in the physical region.

16. A host, comprising:

a processor configured to generate a write command that indicates that a length of data to be transferred to a memory system is smaller than a length of a minimal writable data unit of the memory system; and a storage interface coupled to the processor and configured to send the write command to the memory system, wherein the write command comprises at least one of:

a dummy control field indicative of a location of the data within the minimal writable data unit;

an enable field indicative of whether to enable padding the data with dummy data on the memory system;

a transfer length field indicative of the length of the minimal writable data unit; or a logical block address (LBA) field indicative of a logical location where the data is to be stored in a memory device.

17. The memory system of claim 15, wherein the data and other data written in the zone are associated with an identical application.

18. The memory system of claim 15, wherein Zoned Namespace (ZNS) is implemented in the memory system.

19. The host of claim 16, wherein the write command further comprises an effective length field indicative of the length of the data.

20. The host of claim 17, wherein the storage interface is further configured to send the data that has the length indicated by the effective length field indicative to the memory system.

* * * * *